United States Patent
Parker

(10) Patent No.: US 6,919,289 B1
(45) Date of Patent: Jul. 19, 2005

(54) METHODS AND COMPOSITIONS FOR LOW THERMAL EXPANSION CERAMIC

(75) Inventor: Gerard E. Parker, Nashport, OH (US)

(73) Assignee: Carlisle FoodService Products, Incorporated, Oklahoma City, OK (US)

(*) Notice: Subject to any disclaimer, the term of this patent is extended or adjusted under 35 U.S.C. 154(b) by 0 days.

(21) Appl. No.: 10/959,449

(22) Filed: Oct. 5, 2004

Related U.S. Application Data

(62) Division of application No. 10/397,542, filed on Mar. 26, 2003, now Pat. No. 6,846,768.

(51) Int. Cl.$^7$ .......................... C04B 33/00; C04B 33/24
(52) U.S. Cl. ..................... 501/141; 501/142; 501/143; 501/144; 501/128; 501/129; 264/638; 264/678; 264/680
(58) Field of Search ................. 501/141–144, 501/32, 127–129; 264/638, 679, 680

(56) References Cited

U.S. PATENT DOCUMENTS

| | | |
|---|---|---|
| 3,818,087 A | 6/1974 | Smyser |
| 3,980,447 A | 9/1976 | Franke et al. |
| 4,337,317 A * | 6/1982 | Beard .................. 501/142 |
| 5,102,597 A | 4/1992 | Roe et al. |
| 5,124,188 A | 6/1992 | Roe et al. |
| 5,320,792 A | 6/1994 | Wu et al. |
| 5,334,242 A | 8/1994 | O'Toole |
| 5,545,427 A | 8/1996 | Boilot et al. |
| 5,922,271 A | 7/1999 | Semar et al. |
| 5,962,351 A | 10/1999 | Chyung et al. |
| 6,000,666 A | 12/1999 | Kari |
| 6,004,600 A | 12/1999 | Van Over |
| 6,066,585 A | 5/2000 | Swartz |
| D427,843 S | 7/2000 | Van Over |
| 6,101,930 A | 8/2000 | Van Over |
| 6,190,450 B1 | 2/2001 | O'Toole |
| 6,372,677 B1 | 4/2002 | Nose et al. |
| 6,472,338 B1 | 10/2002 | Shimatani et al. |
| 6,506,699 B1 | 1/2003 | Shindo et al. |

FOREIGN PATENT DOCUMENTS

| | | | |
|---|---|---|---|
| JP | 72-000603 | * | 2/1972 |
| JP | 53-45311 | * | 4/1978 |

* cited by examiner

*Primary Examiner*—Karl Group
(74) *Attorney, Agent, or Firm*—McAfee & Taft

(57) ABSTRACT

Methods and compositions are provided for making low temperature sintering ceramic bodies that have very low thermal expansion and low porosity.

38 Claims, No Drawings

METHODS AND COMPOSITIONS FOR LOW THERMAL EXPANSION CERAMIC

This application is a divisional of application Ser. No. 10/397,542 filed on Mar. 26, 2003, now U.S. Pat. No. 6,846,768.

BACKGROUND OF THE INVENTION

1. Field of the Invention

The present invention relates to compositions and low temperature sintering methods of making ceramic bodies that have low thermal expansion and low porosity.

2. Description of the Prior Art

Porcelain is traditionally made from mixtures of clay, quartz and flux. The clay imparts plasticity and dry strength, the quartz acts as filler, and the flux allows the mixture to fuse more readily. The mixture is vitrified at high temperatures to make high impact strength, low porosity, low water absorption bodies that have been used in a variety of applications including reaction vessels, spark plugs, electrical resistors, corrosion-resistant equipment, pumps, valves, food processing equipment and tableware.

Although porcelain and other ceramics offer many desirable physical properties, the materials are traditionally subject to thermal shock. Thermal shock occurs when a material undergoes a large and rapid change in temperature and the corresponding change in density is too great to be accommodated quickly enough. The result is that the material cracks or breaks. Resistance to thermal shock is reflected in a material's low thermal expansion or low thermal expansion coefficient. Thus, for many applications involving rapid temperature changes, materials having a very low thermal expansion coefficient have been sought.

Applications requiring a ceramic with a very low thermal expansion coefficient include heat exchangers, stovetops, bake ware, catalytic converters and burner nozzles. Ceramic bake ware having a high thermal shock resistance is very desirable because it can be transferred from freezer to oven or from oven to countertop without cracking the ceramic. In addition to thermal shock resistance, such bake ware should have low porosity and low water absorption in order to be stain resistant and dishwasher safe. Current bake stones and similar bake ware do not have sufficiently low porosity to be used in dishwashers. The porosity of current, available bake stones is such that water and soap used in washing will penetrate and/or be absorbed into the bake stone.

$Li_2O$—$Al_2O_3$—$SiO_2$ (LAS) based ceramics with very low thermal expansion have been developed. For example, beta spodumene ($Li_2O$—$Al_2O_3$-4$SiO_2$) bodies have been produced having a thermal expansion coefficient of less than $1.0 \times 10^{-6}/°$ C. Methods for producing beta spodumene ceramics include crystallizing beta spodumene from lithium bearing aluminosilicate glass shapes, sintering shapes formed from beta spodumene produced by sol gel methods, and sintering mixtures of ground beta spodumene glass and minerals. Each of these methods of making LAS based ceramic materials involve additional steps that are often comparatively energy intensive. They also require conventional firing at high temperatures, which is itself energy intensive and increases refractory wear in the kilns compared to low temperature firing.

Thus there are continuing needs for low temperature fired ceramics having low porosity and low thermal expansion coefficients.

SUMMARY OF THE INVENTION

The present invention provides improved methods and compositions for producing ceramic bodies having a low thermal expansion coefficient, high resistance to thermal shock, low porosity and low water absorption. The method of making a ceramic body basically comprises forming a green body from an intimate mixture of vehicle, ceramic precursors and a eutectic composition wherein said eutectic composition has the following analysis by weight: 3% to 4% $Li_2O$, 9.5% to 11.5% MgO, 50% to 60% $SiO_2$, 16% to 18% $Al_2O_3$, 0% to 5% $P_2O_5$, 0% to 4% CaO, 2% to 6% $Na_2O$, 0% to 8% $MnO_2$, less than 1.5% $Fe_2O_3$ and less than 3% other impurities. The green body is sintered to produce a ceramic body.

A preferred method of this invention for making a ceramic body comprises preparing an intimate mixture of carrier, ceramic precursor minerals and eutectic minerals, wherein the weight ratio of precursor minerals to eutectic minerals is in the range of from about 40:60 to 70:30. The ceramic precursor minerals comprise 30% to 40% ball clay, 40% to 50% china clay and 10% to 30% flint by weight thereof. The eutectic minerals comprise 16% to 17% nephylene syenite, 43.5% to 45% montebrasite, 32% to 34% talc and 0% to 8% manganese dioxide by weight. The carrier is present in the intimate mixture in an amount in the range of from about 12% to about 24% by weight thereof. A green body is formed from the intimate mixture and sintered to produce a ceramic body.

Another preferred method of this invention for making a ceramic body comprises preparing an intimate mixture of water and minerals wherein the minerals have an average particle diameter less than 200 microns and comprise 15% to 22% ball clay, 20% to 27% china clay, 5% to 21% flint, 0% to 5% manganese dioxide, 5% to 10% nephylene syenite, 15% to 26% montebrasite and 10% to 20% talc by weight of total minerals. Water is present in the intimate mixture in an amount in the range of from about 12% to about 24% by weight thereof. A green body is formed from the intimate mixture and is sintered at a temperature in the range of from about 1090° C. to about 1120° C. to produce a ceramic body having a thermal expansion coefficient less than about $6 \times 10^{-6}/°$ C. and a porosity of less than 5%.

Compositions of this invention for preparing a ceramic body comprise an intimate mixture of vehicle, ceramic precursors and a eutectic wherein the eutectic has the following approximate analysis by weight: 3% to 4% $Li_2O$, 9.5% to 11.5% MgO, 50% to 60% $SiO_2$, 16% to 18% $Al_2O_3$, 0% to 5% $P_2O_5$, 0% to 4% CaO, 2% to 6% $Na_2O$, 0% to 8% $MnO_2$, less than 1.5% $Fe_2O_3$ and less than 3% other impurities.

A preferred composition of this invention for preparing a ceramic body comprises an intimate mixture of carrier, ceramic precursor minerals and eutectic minerals, wherein the weight ratio of precursor minerals to eutectic minerals is in the range of from about 40:60 to 70:30. The ceramic precursor minerals comprise 30% to 40% ball clay, 40% to 50% china clay and 10% to 30% flint by weight thereof. The eutectic minerals comprise 16% to 17% nephylene syenite, 43.5% to 45% montebrasite, 32% to 34% talc and 0% to 8% manganese dioxide by weight thereof to achieve the eutectic chemical analysis stated above. The carrier is present in the intimate mixture in an amount in the range of from about 12% to about 24% by weight thereof.

Another preferred composition of this invention comprises an intimate mixture of water and minerals wherein the minerals have an average particle diameter less than 200 microns and comprise 15% to 22% ball clay, 20% to 27% china clay, 5% to 21% flint, 0% to 5% manganese dioxide, 5% to 10% nephylene syenite, 15% to 26% montebrasite and 10% to 20% talc by weight thereof. The water is present in the intimate mixture in an amount in the range of from about 12% to about 24% by weight thereof.

Yet another preferred composition of this invention for making a ceramic body has the eutectic composition of this invention and the following overall analysis by dry weight: 0.4% to 3% $Li_2O$, 0.05% to 6% MgO, 50% to 70% $SiO_2$, 15% to 30% $Al_2O_3$, 0.5% to 5% $P_2O_5$, 0% to 4% CaO, 0.5% to 4% $Na_2O$, 0.7% to 2.3% $K_2O$, 0.6% to 5% $MnO_2$, 0% to 4% $Fe_2O_3$ and less than 3% other impurities.

A ceramic body of this invention has a thermal expansion coefficient less than about $7 \times 10^{-6}/°$ C., a porosity less than about 8%, and the following analysis by weight: 0.4% to 3% $Li_2O$, 0.05% to 6% MgO, 50% to 70% $SiO_2$, 15% to 30% $Al_2O_3$, 0.5% to 5% $P_2O_5$, 0% to 4% CaO, 0.5% to 4% $Na_2O$, 0.7% to 2.3% $K_2O$, 0% to 5% $MnO_2$, 0% to 4% $Fe_2O_3$ and less than 3% other impurities.

The objects, features and advantages of the present invention will be readily apparent to those skilled in the art upon a reading of the preferred embodiments which follows.

DESCRIPTION OF PREFERRED EMBODIMENTS

The current invention provides improved methods and compositions for making a ceramic body having a low thermal expansion coefficient, high resistance to thermal shock, low porosity and low water absorption. The method of this invention for making a ceramic body basically comprises forming a green body from an intimate mixture of vehicle, ceramic precursors and a eutectic composition wherein the eutectic composition has the following analysis by weight: 3% to 4% $Li_2O$, 9.5% to 11.5% MgO, 50% to 60% $SiO_2$, 16% to 18% $Al_2O_3$, 0% to 5% $P_2O_5$, 0% to 4% CaO, 2% to 6% $Na_2O$, 0% to 8% $MnO_2$, less than 1.5% $Fe_2O_3$ and less than 3% other impurities. The green body is sintered to produce a ceramic body.

The vehicle is a liquid that carries the solid particles in the intimate mixture and allows the particles to bind together in a manner from which they may be formed into a green body. Suitable vehicles can be inorganic or organic. Vehicle is preferably present in the intimate mixture in an amount in the range of from about 12% to about 24% by weight thereof, and more preferably from about 14% to about 18%. Preferably, the vehicle used is water.

Ceramic precursors preferably comprise clays and silica minerals. Suitable clays include, but are not limited to, ball clay, china clay, fireclay and plastic vitrox. Preferably the clay minerals are a mixture of ball clay and china clay. Suitable silica minerals include, but are not limited to, flint, quartz, chert and feldspathic sand. Preferably the silica minerals are flint.

Preferably the ceramic precursors comprise 30% to 40% ball clay, 40% to 50% china clay and 10% to 30% flint by dry weight of ceramic precursors. The particle size of the ceramic precursors should be small enough, and the particle size distribution narrow enough, to be suitable for the forming process and to enable uniformity during and after sintering. Generally the ceramic precursors have an average particle diameter less than 200 microns, and more preferably less than 100 microns.

The term "eutectic composition" is defined herein as a composition having the following chemical analysis by weight: 3% to 4% $Li_2O$, 9.5% to 11.5% MgO, 50% to 60% $SiO_2$, 16% to 18% $Al_2O_3$, 0% to 5% $P_2O_5$, 0% to 4% CaO, 2% to 6% $Na_2O$, 0% to 8% $MnO_2$, less than 1.5% $Fe_2O_3$ and less than 3% other impurities. Extensive testing would be required to evaluate phase boundaries and actual eutectics for this system. However, this particular composition behaves in a eutectic-like manner as exemplified by the low firing temperatures required to achieve full vitrification. For example, the ceramic bodies of the present invention became fully vitrified after firing at a temperature of about 1090° C. to 1120° C. (cone 2 to cone 4). This compares to temperatures of 1150° C. to 1300° C. (cone 6 to cone 13) required for full vitrification of compositions having the same clay content but feldspathic fluxes rather than the eutectic of this invention. Increasing the $MnO_2$ content of the eutectic to about 4% to 8% by weight is not necessary, but it further improves the vitrification and final ceramic properties.

The eutectic composition is preferably formulated from a mixture of silicate and manganese minerals. Examples of silicate minerals that can utilized in formulation of the eutectic of this invention include, but are not limited to, nephylene syenite, feldspar, montebrasite, spodumene, lepedolite, petalite and talc. Examples of manganese minerals and chemicals that can be utilized in formulation of the eutectic composition of this invention include, but are not limited to, manganese dioxide, manganese carbonate, manganese oxide and manganic oxide. Preferably the eutectic composition comprises a mixture of nephylene syenite, montebrasite, talc and manganese dioxide. More preferably the eutectic composition comprises 16% to 17% nephylene syenite, 43.5% to 45% montebrasite, 32.5% to 34% talc and 0% to 8% manganese dioxide, and most preferably 16% to 17% nephylene syenite, 43.5% to 45% montebrasite, 32.5% to 34% talc and 4% to 8% manganese dioxide.

The particle size of the eutectic components should be small enough, and the particle size distribution narrow enough, to be suitable for the forming process and to enable uniformity and rapid vitrification during sintering. Generally the minerals forming the eutectic composition have an average particle diameter less than 100 microns, and more preferably less than 75 microns.

The vehicle, ceramic precursors and eutectic composition are mixed intimately. The mixing can be accomplished using a Muller mixer, ribbon blender, V blender, or other equipment commercially available and known to those in the art. Preferably mixing is accomplished using a Muller mixer. It is generally not necessary to add a binder prior to mixing since clays, particularly ball clay and china clay, provide necessary binding properties to enable forming of green bodies. Without sufficiently binding clays, however, the intimate mixture additionally comprises a binder such as methylcellulose, magnesium silicate, lignosulfate, bentonite, polyvinyl acetate, polyvinyl alcohol and others known to those skilled in the art.

Examples of forming processes that may be used to make the green body of this invention include, but are not limited to, extrusion, pressure casting, dry pressing, and ram pressing of an extruded pug. Preferably, forming is accomplished by ram pressing an extruded pug.

Finishing of the formed green body is necessary for both aesthetic appeal and reduction of cracking during the tempering, or firing, process. Finishing is well known to those skilled in the art and involves trimming the fins at the joints or edges. This process is often referred to as fettling and may be done on a lathe or a horizontal wheel such as a potter's wheel. The finished piece may also be washed with a sponge to give a uniform appearance.

The temperature increase during sintering is generally much too rapid to allow the vaporized water within the green body to escape without damaging the green body. Therefore the green body is generally dried to remove excess moisture and organic, if present, before sintering. Drying is accomplished by simply air drying or by mechanical drying using drying equipment known to those in the art. The green body is preferably dried to less than 2% moisture by weight of the green body, and more preferably to less than 0.5% moisture.

Preferably, the green body is sintered in air at a time and temperature combination to achieve a cone 2 to cone 4. The cone system is well known to those skilled in the art and reflects the energy of the system. A cone 2 to cone 4 corresponds roughly to sintering at a temperature in the range of from about 1090° C. to about 1120° C. Use of the eutectic composition of this invention provides for full vitrification during sintering at this relatively low temperature. Because of the extent of vitrification, the sintered product has a porosity of less than 8%, preferably less than 5% and more preferably less than 2%. A correspondingly low water absorption of 1%, more preferably 0.5% is also achieved. Porosity and water absorption are measured according to ASTM C373-88.

The sintered product of this invention includes a beta spodumene solid solution and silica. It is believed that the free silica is assimilated in the beta spodumene solid solution and produces a solid solution that exhibits lower thermal expansion than the beta spodumene phase. This low thermal expansion, reflected in the low thermal expansion coefficient, makes the ceramic body of this invention suitable for heat shock-resistant applications. The thermal expansion coefficient of the ceramic body of this invention is generally less than about $7 \times 10^{-6}/°$ C., preferably less than about $6 \times 10^{-6}/°$ C., and more preferably less than about $5 \times 10^{-6}/°$ C.

The bodies formed in the present invention can have any size and shape. The process and compositions are particularly suited for bake ware, especially bake ware for applications involving large and rapid temperature changes and therefore requiring thermal shock resistance. For the same reasons, the process and compositions of this invention are particularly well suited for bake stones. The bake stones made utilizing the process and compositions herein may be made to any shape desired such as for cake pans, pie pans, pizza stones and other bake ware. The bake ware in bake stones formed utilizing the methods and composition comprised herein advances over prior art because of the thermal shock characteristics of the compositions and because of the low porosity and low moisture absorption. Because the coefficient of thermal expansion of the compositions described herein is less than about $7 \times 10^{-6}/°$ C., and preferably less than about $6 \times 10^{-6}/°$ C., the thermal shock characteristics of the bake ware and bake stones are such that they can be transferred from the freezer to the oven and from the oven to the counter top without cracking or breaking the bake ware. Because the porosity of the compositions described herein is less than about 8%, and preferably less than about 5%, the bake ware and bake stones described herein are dishwasher safe. In other words, the bake stones may be placed in the dishwasher and, unlike prior art bake stones, will not absorb the soap and/or water so that the performance characteristics of the bake stones are unaffected and so that no soap or other foreign substance is absorbed into the bake stone.

A preferred method of this invention for making a ceramic body comprises preparing an intimate mixture of carrier, ceramic precursor minerals and eutectic minerals, wherein the weight ratio of precursor minerals to eutectic minerals is in the range of from about 40:60 to 70:30. The ceramic precursor minerals comprise 30% to 40% ball clay, 40% to 50% china clay and 10% to 30% flint by weight thereof. The eutectic minerals comprise 16% to 17% nephylene syenite, 43.5% to 45% montebrasite, 32% to 34% talc and 0% to 8% manganese dioxide by weight thereof, thus providing the defined eutectic composition chemical analysis. More preferably, manganese dioxide is present in the eutectic composition in the range of from about 2% to about 8% by weight thereof and most preferably from about 4% to about 8%. The carrier is present in the intimate mixture in an amount in the range of from about 12% to about 24% by weight thereof. Preferably, the carrier is water. A green body is formed from the intimate mixture and sintered to produce a ceramic body.

Preferably, the green body is sintered at a temperature of from about 1090° C. to 1120° C. Preferably the ceramic body has a porosity of less than 8%, more preferably less that 5% and most preferably less than 2%. Preferably the ceramic body of this invention has a thermal expansion coefficient of less than about $7 \times 10^{-6}/°$ C., more preferably less than $6 \times 10^{-6}/°$ C. and most preferably less than about $5 \times 10^{-6}/°$ C.

A particularly preferred method of this invention for making a ceramic body comprises preparing an intimate mixture of water and minerals wherein the minerals have an average particle diameter less than 200 microns and comprise 15% to 22% ball clay, 20% to 27% china clay, 5% to 21% flint, 0.6% to 5% manganese dioxide, 5% to 10% nephylene syenite, 15% to 26% montebrasite and 10% to 20% talc by weight of total minerals. Water is present in the intimate mixture in an amount in the range of from about 12% to about 24% by weight thereof, more preferably from about 14% to 18%. A green body is formed from the intimate mixture and is sintered at a temperature in the range of from about 1090° C. to about 1120° C. to produce a ceramic body having a thermal expansion coefficient less than about $6 \times 10^{-6}/°$ C. and a porosity of less than 5%. The mineral composition of this method provides the required eutectic to achieve these values for the thermal expansion coefficient and porosity at these relatively low sintering temperatures.

Preferred compositions of this invention for preparing a ceramic body comprise an intimate mixture of vehicle, ceramic precursors and a eutectic wherein the eutectic has the following analysis by weight: 3% to 4% $Li_2O$, 9.5% to 11.5% $MgO$, 50% to 60% $SiO_2$, 16% to 18% $Al_2O_3$, 0% to 5% $P_2O_5$, 0% to 4% $CaO$, 2% to 6% $Na_2O$, 0% to 8% $MnO_2$, less than 1.5% $Fe_2O_3$ and less than 3% other impurities. More preferably, the $MnO_2$ analysis of the eutectic is 4% to 8% by weight.

Another preferred composition of this invention for preparing a ceramic body comprises an intimate mixture of carrier, ceramic precursor minerals and eutectic minerals, wherein the weight ratio of precursor minerals to eutectic minerals is in the range of from about 40:60 to 70:30. The ceramic precursor minerals comprise 30% to 40% ball clay, 40% to 50% china clay and 10% to 30% flint by weight thereof. The eutectic minerals comprise 16% to 17% nephylene syenite, 43.5% to 45% montebrasite, 32% to 34% talc and 0% to 8% manganese dioxide by weight thereof. The carrier is present in the intimate mixture in an amount in the range of from about 12% to about 24% by weight thereof and more preferably from 14% to 18%. Preferably the carrier is water.

A particularly preferred composition of this invention comprises an intimate mixture of water and minerals wherein the minerals have an average particle diameter less than 200 microns and comprise 15% to 22% ball clay, 20% to 27% china clay, 5% to 21% flint, 0.6% to 5% manganese dioxide, 5% to 10% nephylene syenite, 15% to 26% montebrasite and 10% to 20% talc by weight thereof. The water is present in the intimate mixture in an amount in the range of from about 12% to about 24% by weight thereof, and more preferably from 14% to 18%.

Still another preferred composition of this invention for making a ceramic body has the following analysis by dry weight: 0.4% to 3% Li$_2$O, 0.05% to 6% MgO, 50% to 70% SiO$_2$, 15% to 30% Al$_2$O$_3$, 0.5% to 5% P$_2$O$_5$, 0% to 4% CaO, 0.5% to 4% Na$_2$O, 0.7% to 2.3% K$_2$O, 0% to 5% MnO$_2$, 0% to 4% Fe$_2$O$_3$ and less than 3% other impurities. The ceramic body made from this composition has a thermal expansion coefficient less than about 7×10$^{-6}$/° C., preferably less than 6×10$^{-6}$/° C., and more preferably less than about 5×10$^{-6}$/° C. The ceramic body made from this composition has a porosity less than about 8%, preferably less than 5% and more preferably less than about 2%.

A preferred ceramic body of this invention has a thermal expansion coefficient less than about 7×10$^{-6}$/° C., a porosity less than about 8%, and the following analysis by weight: 0.4% to 3% Li$_2$O, 0.05% to 6% MgO, 50% to 70% SiO$_2$, 15% to 30% Al$_2$O$_3$, 0.5% to 5% P$_2$O$_5$, 0% to 4% CaO, 0.5% to 4% Na$_2$O, 0.7% to 2.3% K$_2$O, 0% to 5% MnO$_2$, 0% to 4% Fe$_2$O$_3$ and less than 3% other impurities. More preferably the thermal expansion coefficient is less than about 6×10$^{-6}$/° C., and most preferably the thermal expansion coefficient is less than about 5×10$^{-6}$/° C. More preferably the porosity of the ceramic body is less than 5% and most preferably less than 2%. Preferably the ceramic body of this invention is bake ware and more preferably a bake stone.

A preferred bake stone of this invention has a thermal expansion coefficient less than about 7×10$^{-6}$/° C., a porosity less than about 8%, and is produced by sintering green ware at a temperature in the range of from about 1090° C. to about 1120° C. or from a cone 2 to cone 4. It has not previously been possible to produce a bake stone with these properties by sintering at temperatures this low. More preferably the thermal expansion coefficient of the bake stone is less than about 6×10$^{-6}$/° C., and most preferably the thermal expansion coefficient is less than about 5×10$^{-6}$/° C. More preferably the porosity of the bake stone is less than 5% and most preferably less than 2%.

In order to further illustrate the methods and compositions of the present invention, the following example is given.

EXAMPLE

Eutectic and precursor minerals were mixed to give test compositions 1 through 6, the analyses for which are shown in the table below. All composition values tabulated below are in weight percent. The mixtures were formed into green bodies, dried and sintered to cone 3. The resulting ceramic bodies were then evaluated for thermal shock resistance and moisture absorption. The coefficient of thermal expansion was measured at 1000° C. Moisture absorption was measured using procedures in ASTM 373. Low moisture absorption coincides fairly well with low porosity.

As can be seen, very small changes in composition result in large changes in moisture absorption and the coefficient of thermal expansion. Also, improvements in absorption values do not necessarily coincide with improvements in the coefficient of thermal expansion. Composition 1 below is most preferred since it combines excellent thermal shock resistance with low absorption.

Examples of Low Temperature Sintered Ceramic Compositions (%) and Properties

|  | 1 | 2 | 3 | 4 | 5 | 6 |
|---|---|---|---|---|---|---|
| CaO | 1.45 | 0.71 | 2.03 | 0.13 | 1.91 | 0.43 |
| Li$_2$O | 1.5 | 2.95 | 2.35 | 0.42 | 2.21 | 1.75 |
| MgO | 4.87 | 1.83 | 1.46 | 1.03 | 1.41 | 0.05 |
| K$_2$O | 0.7 | 1.46 | 2.32 | 2 | 2.15 | 1.63 |
| Na$_2$O | 0.94 | 2 | 3.16 | 3.47 | 2.94 | 1.8 |
| Fe$_2$O$_3$ | 0.27 | 0.56 | 0.18 | 0.18 | 0.18 | 0.3 |
| MnO$_2$ | 2.47 | 0.01 | 0.01 | 0.01 | 0.01 | 0 |
| TiO$_2$ | 0.41 | 0.73 | N/A | N/A | N/A | 0.48 |
| P$_2$O$_5$ | 1.82 | 1.28 | 2.86 | 3.42 | 2.68 | 2.13 |
| Al$_2$O$_3$ | 24.03 | 26.23 | 21.32 | 23.01 | 19.97 | 28.24 |
| SiO$_2$ | 61.54 | 62.24 | 64.31 | 62.4 | 66.55 | 63.18 |
| CTE, ° C.$^{-1}$ | 3.55 | 4.22 | 5.01 | 5.03 | 4.62 | 4.8 |
| % Abs. | 0.45 | 15.8 | 0.46 | 0.5 | 0.79 | 9.2 |

Thus, the present invention is well adapted to attain the objects and advantages mentioned as well as those that are inherent therein. While numerous changes may be made by those skilled in the art, such changes are encompassed within the spirit of this invention as defined by the appended claims.

What is claimed is:

1. A method of making a ceramic body comprising:
   (a) forming a green body from an intimate mixture of vehicle, ceramic precursors and a eutectic composition wherein said eutectic composition has the following analysis by weight: 3% to 4% Li$_2$O, 9.5% to 11.5% MgO, 50% to 60% SiO$_2$, 16% to 18% Al$_2$O$_3$, 0% to 5% P$_2$O$_5$, 0% to 4% CaO, 2% to 6% Na$_2$O, 0% to 8% MnO$_2$, less than 1.5% Fe$_2$O$_3$ and less than 3% other impurities; and
   (b) sintering said green body to produce a ceramic body.

2. The method of claim 1 wherein said vehicle is water, and said water is present in said intimate mixture in an amount in the range of from about 12% to about 24% by weight thereof.

3. The method of claim 1 wherein said ceramic precursors comprise clays and silica minerals, said clays selected from the group consisting of ball clay, china clay, fire clay and plastic vitrox, and said silica minerals selected from the group consisting of flint, quartz, chert and feldspathic sand.

4. The method of claim 1 wherein said ceramic precursors comprise 30% to 40% ball clay, 40% to 50% china clay and 10% to 30% flint by weight thereof.

5. The method of claim 1 wherein said ceramic precursors have an average particle diameter less than about 200 microns.

6. The method of claim 1 wherein said eutectic composition is formulated from silicate minerals and manganese minerals and chemicals, said silicate minerals selected from the group consisting of nephylene syenite, feldspar, montebrasite, lepedolite, petalite, spodumene and talc.

7. The method of claim 1 wherein said eutectic composition comprises a mixture of nephylene syenite, montebrasite, talc and manganese dioxide.

8. The method of claim 1 wherein said eutectic composition comprises 16% to 17% nephylene syenite, 43.5% to 45% montebrasite, 32.5% to 34% talc and 0% to 8% manganese dioxide by weight thereof.

9. The method of claim 1 wherein said eutectic composition has an average particle diameter less than about 100 microns.

10. The method of claim 1 wherein said forming is accomplished by extrusion, pressure casting, dry pressing or ram pressing of an extruded pug.

11. The method of claim 1 wherein said forming is accomplished by ram pressing an extruded pug of said intimate mixture.

12. The method of claim 1 additionally comprising drying said green body prior to sintering.

13. The method of claim 1 wherein said green body is sintered at a temperature in the range of from about 1090° C. to about 1120° C.

14. The method of claim 1 wherein said ceramic body has a thermal expansion coefficient less than about $7 \times 10^{-6}/°$ C. and a porosity less than about 8%.

15. The method of claim 1 wherein said ceramic body has a thermal expansion coefficient less than about $6 \times 10^{-6}/°$ C. and a porosity less than about 5%.

16. The method of claim 1 wherein said ceramic body is bake ware.

17. The method of claim 1 wherein said ceramic body is a bake stone.

18. A method of making a ceramic body comprising:
(a) preparing an intimate mixture of carrier, ceramic precursor minerals and eutectic minerals, wherein the weight ratio of precursor minerals to eutectic minerals is in the range of from about 40:60 to 70:30, wherein said ceramic precursor minerals comprise 30% to 40% ball clay, 40% to 50% china clay and 10% to 30% flint by weight thereof, said eutectic minerals comprise 16% to 17% nephylene syenite, 43.5% to 45% montebrasite, 32% to 34% talc and 0% to 8% manganese dioxide by weight thereof, and wherein said carrier is present in said intimate mixture in an amount in the range of from about 12% to about 24% by weight thereof;
(b) forming a green body from said intimate mixture;
(c) sintering said green body to produce a ceramic body.

19. The method of claim 18 wherein said ceramic precursor minerals have an average particle diameter less than 200 microns and said eutectic minerals have an average particle diameter less than 100 microns.

20. The method of claim 18 further comprising drying said green body prior to sintering.

21. The method of claim 18 wherein said forming is accomplished by ram pressing an extruded pug of said intimate mixture.

22. The method of claim 18 wherein said ceramic body has a thermal expansion coefficient less than about $7 \times 10^{-6}/°$ C. and a porosity less than about 8%.

23. The method of claim 18 wherein said ceramic body has a thermal expansion coefficient less than about $6 \times 10^{-6}/°$ C. and a porosity less than about 5%.

24. A method of making a ceramic body comprising:
(a) preparing an intimate mixture of water and minerals wherein said minerals have an average particle diameter less than 200 microns and comprise 15% to 22% ball clay, 20% to 27% china clay, 5% to 21% flint, 0% to 5% manganese dioxide, 5% to 10% nephylene syenite, 15% to 26% montebrasite and 10% to 20% talc by weight of total minerals, wherein said water is present in said intimate mixture in an amount in the range of from about 12% to about 24% by weight thereof;
(b) forming a green body from said intimate mixture;
(c) sintering said green body at a temperature in the range of from about 1090° C. to about 1120° C. to produce a ceramic body having a thermal expansion coefficient less than about $6 \times 10^{-6}/°$ C. and a porosity of less than 5%.

25. The method of claim 24 further comprising drying said green body prior to sintering.

26. The method of claim 24 wherein said forming is accomplished by ram pressing an extruded pug of said intimate mixture.

27. A composition for preparing a ceramic body comprising an intimate mixture of vehicle, ceramic precursors and a eutectic wherein said eutectic has the following analysis by weight: 3% to 4% $Li_2O$, 9.5% to 11.5% MgO, 50% to 60% $SiO_2$, 16% to 18% $Al_2O_3$, 0% to 5% $P_2O_5$, 0% to 4% CaO, 2% to 6% $Na_2O$, 0% to 8% $MnO_2$, less than 1.5% $Fe_2O_3$ and less than 3% other impurities.

28. The composition of claim 27 wherein said vehicle is water, and said water is present in said composition in an amount in the range of from about 17% to about 20% by weight thereof.

29. The composition of claim 27 wherein:
said ceramic precursors comprise clays and silica minerals, said clays selected from the group consisting of ball clay, china clay, fire clay and plastic vitrox; and
said silica minerals selected from the group consisting of flint, quartz, chert and feldspathic sand.

30. The composition of claim 27 wherein said ceramic precursors comprise 30% to 40% ball clay, 40% to 50% china clay and 10% to 30% flint by thereof.

31. The composition of claim 27 wherein said ceramic precursors have an average particle diameter less than about 200 microns.

32. The composition of claim 27 wherein said eutectic is formulated from silicate minerals and manganese minerals and chemicals, said silicate minerals selected from the group consisting of nephylene syenite, feldspar, montebrasite, spodumene, lepedolite, petolite and talc.

33. The composition of claim 27 wherein said eutectic comprises a mixture of nephylene syenite, montebrasite, talc and manganese dioxide.

34. The composition of claim 27 wherein said eutectic comprises 16% to 17% nephylene syenite, 43.5% to 45% montebrasite, 32.5% to 34% talc and 0% to 8% manganese dioxide by weight thereof.

35. The composition of claim 27 wherein said eutectic has an average particle diameter less than about 100 microns.

36. A composition for preparing a ceramic body comprising an intimate mixture of carrier, ceramic precursor minerals and eutectic minerals, wherein the weight ratio of precursor minerals to eutectic minerals is in the range of from about 40:60 to 70:30, wherein said ceramic precursor minerals comprise 30% to 40% ball clay, 40% to 50% china clay and 10% to 30% flint by weight thereof, said eutectic minerals comprise 16% to 17% nephylene syenite, 43.5% to 45% montebrasite, 32% to 34% talc and 0% to 8% manganese dioxide by weight thereof, and wherein said carrier is present in said intimate mixture in an amount in the range of from about 12% to about 24% by weight thereof.

37. The composition of claim 36 wherein said ceramic precursor minerals have an average particle diameter less than 200 microns and said eutectic minerals have an average particle diameter less than 100 microns.

38. A composition for preparing a ceramic body comprising an intimate mixture of water and minerals wherein said minerals have an average particle diameter less than 200 microns and comprise 15% to 22% ball clay, 20% to 27% china clay, 5% to 21% flint, 0% to 5% manganese dioxide, 5% to 10% nephylene syenite, 15% to 26% montebrasite and 10% to 20% talc by weight thereof, wherein said water is present in said intimate mixture in an amount in the range of from about 12% to about 24% by weight thereof.

* * * * *